June 10, 1941.　　　R. F. JOYCE　　　2,244,951
LOCK MECHANISM
Filed Nov. 29, 1938　　　3 Sheets-Sheet 1
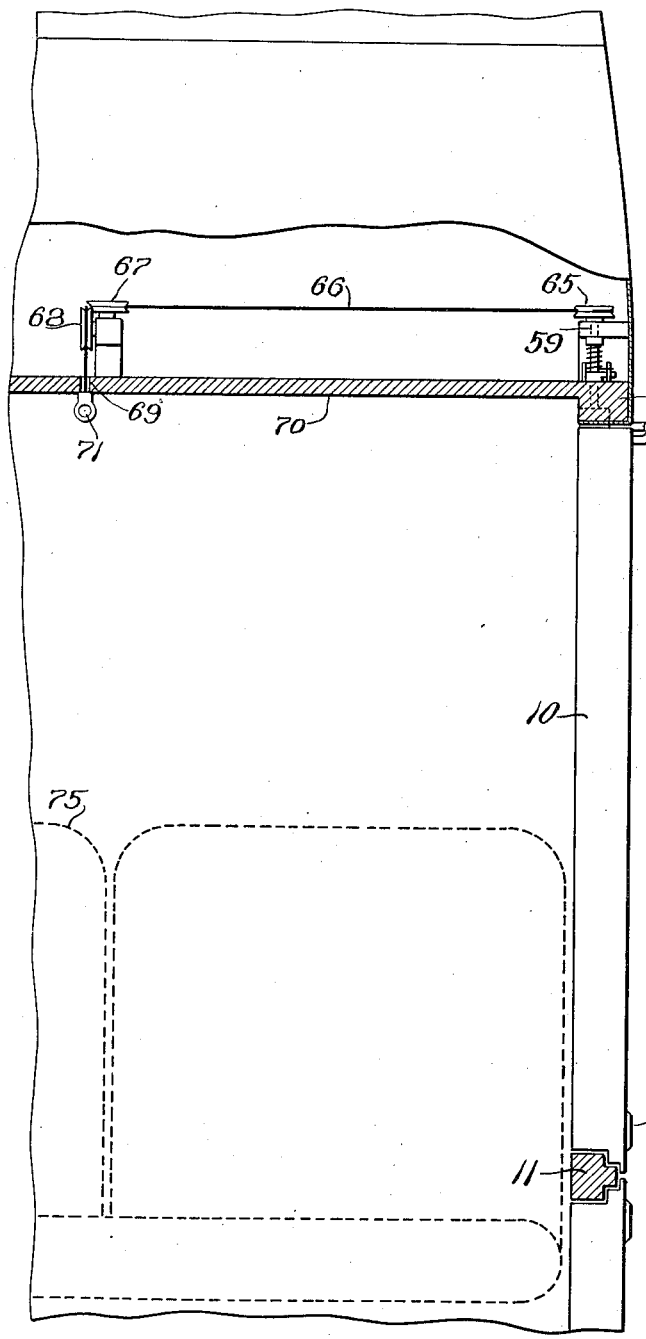
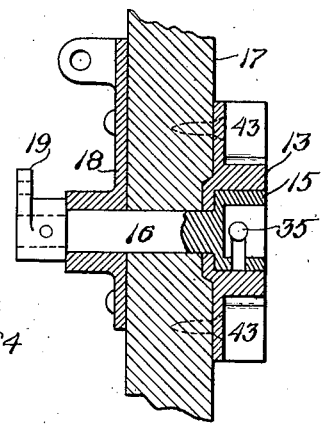
Fig. 2.
Fig. 1.
Inventor=
Richard F. Joyce
By Arthur F. Randall
atty.

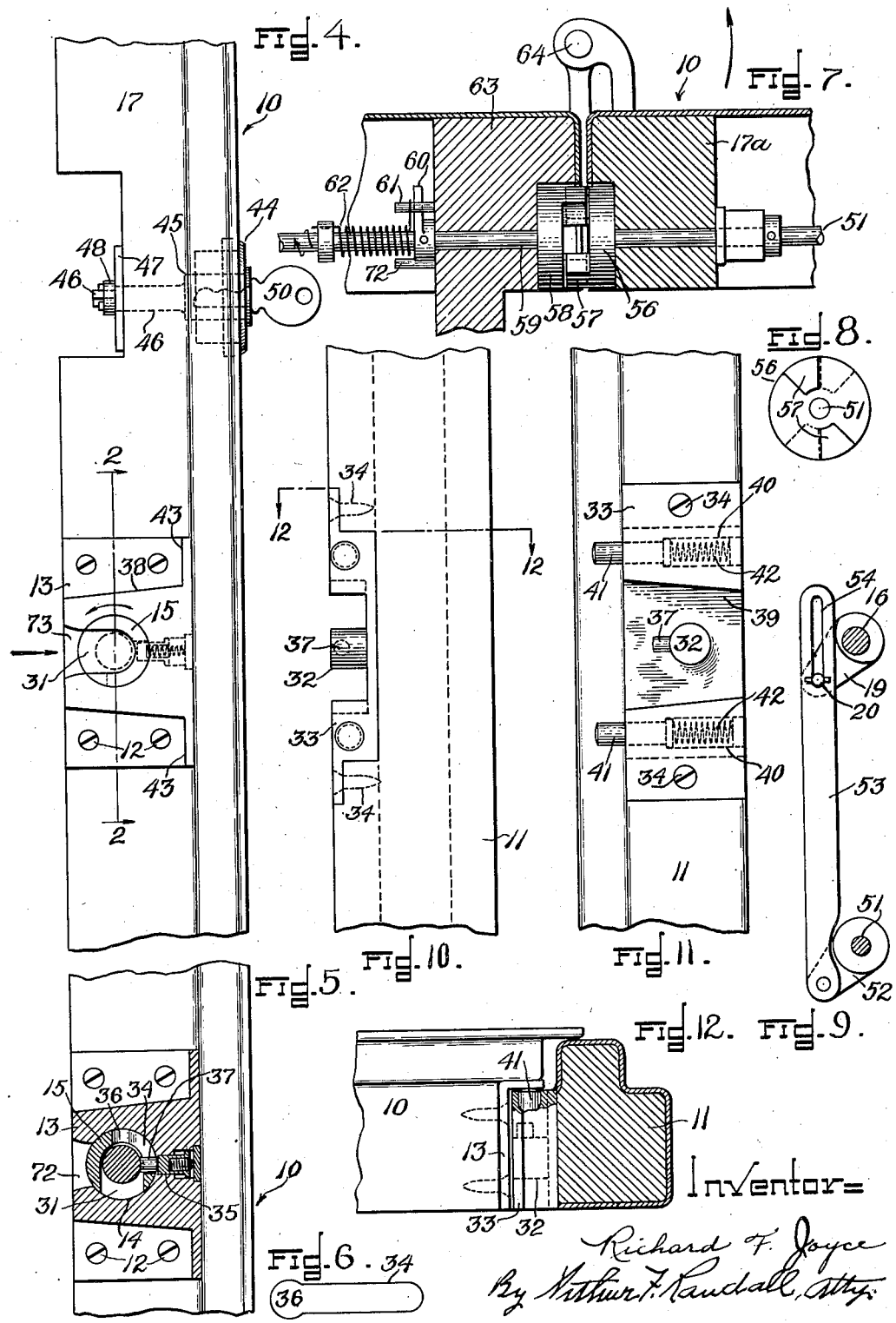

Patented June 10, 1941

2,244,951

UNITED STATES PATENT OFFICE 2,244,951

LOCK MECHANISM

Richard F. Joyce, Haverhill, Mass.

Application November 29, 1938, Serial No. 242,972

6 Claims. (Cl. 70—136)

My invention relates to lock mechanisms for doors and other closures and more especially to lock mechanisms for the doors of automobiles.

It is an object of this invention to provide an efficient lock mechanism for automobile doors. It is also an object of this invention to provide a key-operated lock mechanism of simple and efficient construction which is particularly adapted for use in connection with the doors of automobiles and in the best form of my invention the mechanism is not only operable by means of a key from the exterior of the vehicle but it is also operable to unlock the door through the medium of a device on the dash or instrument panel that is accessible to a person within the car.

To these ends I have provided a lock mechanism having the features of construction and operation set forth in the following description, the several novel features of the invention being separately pointed out and defined in the claims at the close thereof.

In the accompanying drawings—

Figure 1 is a plan view, partly in section, of the forward end portion of an automobile equipped with my new door lock mechanism.

Figure 2 is a section on line 2—2 of Fig. 4.

Figure 4 is an elevation of a portion of the rear edge of the door shown in Figs. 1 and 3, with the rotary bolt, hereinafter referred to, in its open position.

Figure 5 is a rear edge view of a portion of the door partly in section on line 5—5 of Fig. 3, but showing the rotary bolt in its closed door-locking position.

Figure 6 is a diagrammatic development of the slot provided in the rotary bolt as hereinafter described.

Figure 7 is a section on line 7—7 of Fig. 3 but also including a portion of the frame of the automobile and parts of the mechanism mounted thereon.

Figure 8 is a detail of one of the coupling members hereinafter referred to.

Figure 9 is a section on line 9—9 of Fig. 3.

Figure 10 is an elevation of a portion of the inner side of the post 11 forming part of the frame of the automobile shown in Fig. 1.

Figure 11 is an elevation, viewed toward the rear of the car, of that portion of the post 11 which is shown in Fig. 10.

Figure 12 is a section on line 12—12 of Fig. 10 but also including a portion of the door 10.

Figure 3:
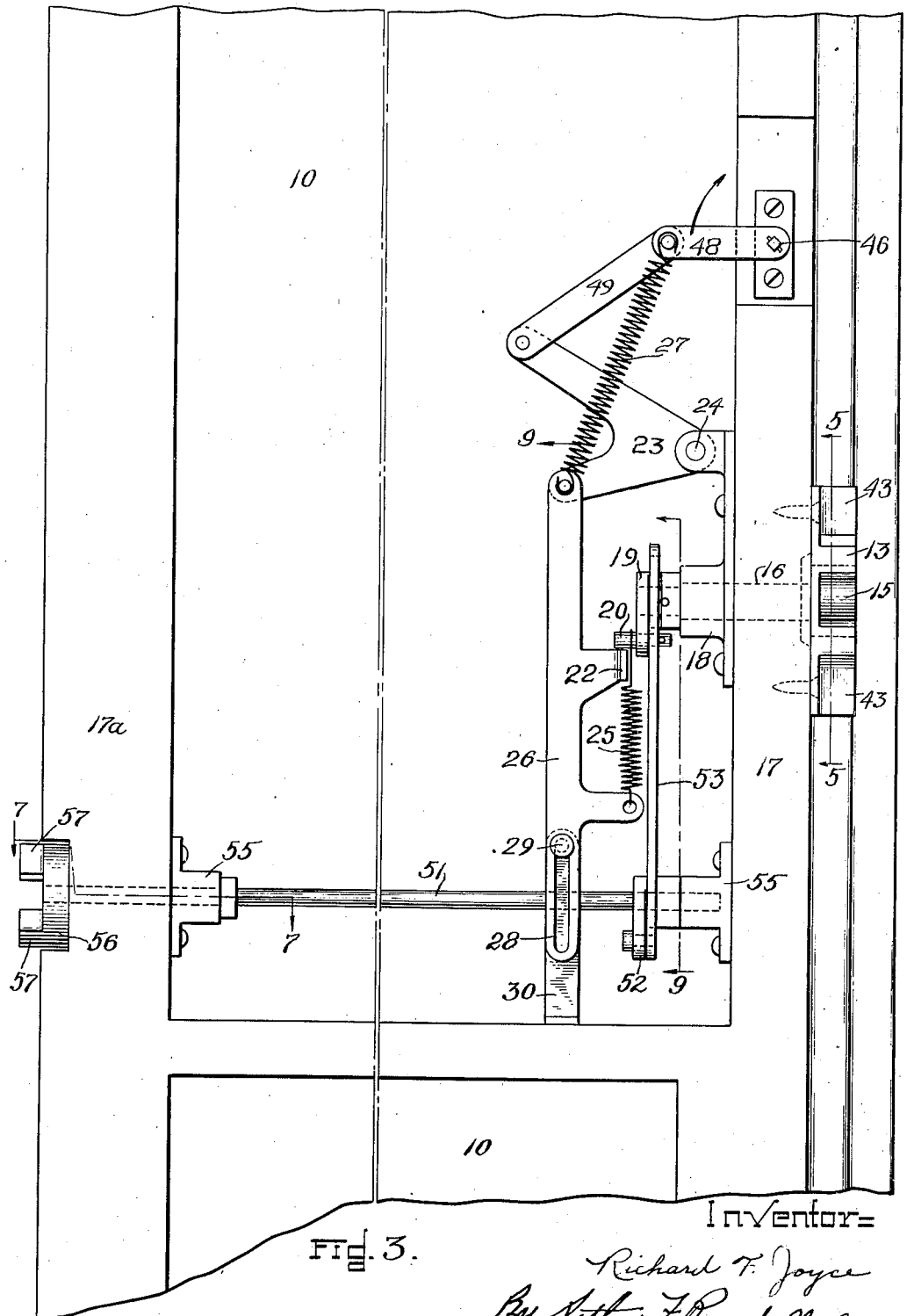
Figure 3 is a partial elevation of the inner side of the door shown at 10 in Fig. 1.

Secured in position upon the rear edge of the door 10 by means of screws 12 is a metal fixture 13, Figs. 2, 3, 4, 5, and 12 that is formed with a parti-cylindrical pocket 14, Fig. 5, within which is arranged a rotatable parti-cylindrical bolt member 15 constructed with a spindle or stem 16, Figs. 2 and 3, which extends inwardly through an aperture provided through the inner wall of the bracket fixture 13, through the vertical side bar 17 forming part of the frame of the door 10, and through a second bracket fixture 18 fastened by screws to the inner side of bar 17. Fixed in position upon the inner end of spindle 16 is a radial apertured arm 19 carrying a stud 20 occupying a position immediately above an arm 22 forming part of a slide-bar 26 and through which slide-bar 26 acts at times to swing arm 19 upwardly thereby to rock spindle 16 and bolt member 15.

A spring 25 having one end thereof connected with the stud 20 and its opposite end connected with slide-bar 26 yieldingly holds the arm 19 at the limit of its downward movement with the rotary bolt 15 occupying its door-locking position as shown in Figs. 3 and 5.

A second spring 27, Fig. 3, of greater effective strength than spring 25 serves, as will be hereinafter described, to yieldingly hold the slide-bar 26 at the limit of its downward movement with spring 25 under tension. The lower end of slide-bar 26 is made with a longitudinal slot 28 that is occupied by a stop stud 29 projecting from a bracket 30 which is a rigid part of the frame of the door and the engagement of the upper end of this slot with the stud 29 limits the downward movement of slide-bar 26 under the influence of spring 27.

As shown in Figs. 2, 4 and 5 the rotary bolt member 15 is cup-shaped and at one side thereof is made with a gateway 31 through which a stud 32 on post 11, Figs. 10 and 11, is free to pass into said cup-shaped rotary bolt member when the latter occupies its open position shown in Fig. 4 and the door is swung from an open position to its closed position shown in Fig. 12.

The stud 32, Figs. 10, 11 and 12, is cylindrical and is a rigid part of a bracket fixture 33 fastened by screws to the front or forward side of the post 11 which latter is part of the frame of the body of the automobile, said stud 32 being positioned on the post 11 so that when the door 10 is swung into its closed position the stud will pass through the gateway 31 into the interior of the cup-shaped rotary bolt member 15 as indicated by the arrow in Fig. 4 and as shown in Fig. 5.

The parti-cylindrical side wall of the rotary bolt member 15 is made with a circumferential key hole slot 34 and a diagrammatic development of this slot is shown in Fig. 6.

When the bolt member 15 is turned from the position shown in Fig. 5 into the position shown in Fig. 4 to unlock the door and the latter is swung outwardly a spring-pressed tumbler 35 is projected into the enlarged end 36, Fig. 6, of the slot 34 thereby automatically locking the bolt member in its open position shown in Fig. 4 and said bolt member remains thus locked in its open position by the tumbler until the door 10 is again closed.

When the door 10 is next moved into its closed position the stud 32 re-enters the bolt member and a laterally projecting extension or pin 37 on said stud 32 passes into the enlarged end 36 of slot 34 and retracts the tumbler 35 whereupon the spring 25, Fig. 3, rotatively adjusts bolt member 15 in the direction of the arrow, Fig. 4, from the position shown in said Fig. 4 to that shown in Fig. 5. This rotary adjustment of the bolt member while the slot 34 is occupied by pin 37 is made possible by the fact that the latter is less in diameter than the width of the narrow portion of the slot 34. On the other hand the tumbler 35 is of a diameter to fit only the enlarged end portion 36 of slot 34 so that when it is in position within said enlarged end it serves to lock the bolt member against turning in either direction. The exposed outer side of bracket fixture 13 which is mounted on door 10 is made with a wedge-shaped boss 38, Figs. 4 and 5, which is adapted to mesh with and occupy a wedge-shaped socket 39, Figs. 10 and 11, provided upon the outer face of the bracket fixture 33 that is mounted on the post 11 of the body frame when the door is closed and, as will be clear, said boss moves into and out of said socket as the door 10 is closed and opened.

The bracket fixture 33 on post 11 is formed with two chambers 40, Fig. 11, one above and the other below the socket 39 and in each of these chambers is slidably mounted a plunger 41 which is yieldingly urged outwardly by a coiled spring 42. When the door 10 is swung outwardly into an open position these plungers 41 are held in projected positions by their springs 42 as shown in Fig. 11, but when the door 10 is closed abutment surfaces 43 on the bracket fixture 13 of door 10, Figs. 2, 3 and 4, engage the outer ends of the plungers 41 and force the latter inwardly compressing springs 42. It will therefore be clear that when bolt member 15 is turned from the position shown in Fig. 5 to the position shown in Fig. 4 to unlock the door the spring-pressed plungers 41 will partly open door 10. That is, these spring-pressed plungers start the opening movement of the door.

Mounted upon the door 10 above the above-described lock mechanism is a supplemental key-operated lock mechanism 44, Figs. 1 and 4, which is of ordinary construction with the exception that its barrel 45 is made with a spindle extension 46 rotatably supported near its inner end by a bearing plate 47 fastened by screws to the vertical rail 17 of the door frame.

Fixed in position upon the inner end of spindle 46 is an arm 48, Figs. 3 and 4, which is connected by a link 49 with the upper longer arm of a bell crank 23, said arm 48 and link 49 constituting the two members of a toggle through which the force of spring 27 is normally imposed upon the longer arm of the bell crank with much greater effect than the upward pull of said spring upon the shorter arm of the bell crank to which the lower end of the spring is connected. As a result, the spring 27 yieldingly urges slide-bar 26 downwardly with more force than the upward pull of spring 25 even when the tension of the latter is increased through opening movement of bolt 15.

The door 10 may be unlocked by a person outside of the vehicle by inserting a special key 50 into the barrel 45 of the supplemental lock mechanism 44 and then turning the same and spindle 46 in the direction of the arrow, Fig. 3, to the extent of about 90 degrees. This swings the bell crank lever 23 upwardly and the latter acts through slide-bar 26, arm 22 and arm 19 to turn the bolt member 15 from the position shown in Fig. 5 to the position shown in Fig. 4 whereupon the spring-pressed plungers 41, Fig. 11, shift the door 10 into an open position.

When bolt member 15 is thus adjusted to unlock the door the tumbler 35, Fig. 5, is projected by its spring into the enlarged end of slot 34 and thereby locks the bolt member in its open position.

To close and lock the door it is only necessary to apply finger pressure to the outer side thereof sufficient to cause the pin 37 on stud 32, Fig. 11, to eject the tumbler 35 from slot 34 whereupon spring 25, Fig. 3, snaps the bolt member into its closed position shown in Fig. 5.

From the description so far given it will be observed that a lock-operating handle permanently disposed upon the outside of the door may be dispensed with and that it is not necessary to slam the door in order to close and lock the same. It is true, however, that a permanent handle connected with spindle 46, Fig. 4, may be substituted for the removable key 50 although I prefer the latter.

It will be observed that the arm 48 and link 49, Fig. 3, constitute a toggle through which the spring 27 acts to yieldingly hold bell crank 23 in its lowermost position with the upper end of slot 28 against the stud 29 and with spring 25 under tension.

Herein I have shown mechanism through which the above described main door locking devices may be operated by a person within the vehicle and as herein illustrated this mechanism is accessible for operation by the driver of the vehicle.

The mechanism just referred to comprises a horizontal rock shaft 51, Figs. 3, 7, 8 and 9, journaled in brackets 55 fixed to the inner faces of the upright side bars 17 and 17a of the door. This shaft carries an arm 52 to which is pivotally connected the lower end of push-bar 53. The upper end of this push-bar is formed with a longitudinal slot 54, Fig. 9, which is occupied by one end of stud 29. Normally the stud 29 occupies a position at the lower end of slot 54 so that arm 19 and bolt member 15 can be operated by bell crank 23 and slide-bar 26 independently of the push-bar 53.

At one end thereof rock shaft 51 has fixed on it a head 56 whose outer face is made, as shown in Fig. 8, with a pair of lugs 57 to cooperate with the two lugs of a similarly constructed head 58, Fig. 7, fast on a rock shaft 59, journaled in bearings provided on the frame of the body of the vehicle so that when the door 10 is closed the two shafts 51 and 59 are in axial alinement and coupled together. The lugs of the heads 56 and 58 are of segmental shape and measure forty-five degrees in width and, therefore, when the two sets of lugs are in mesh it is possible for one head to move relatively to the other head in one direction to the extent of ninety degrees as will be clear from Fig. 3.

An arm 60 on rock shaft 59 is normally held against a stop pin 61 by a coiled spring 62, the lugs of head 58 occupying positions behind the lug 57 of head 56. It will therefore be clear that if one quarter of a revolution be imparted to rock shaft 59 in the direction of the arrow, Fig. 7, the lugs of its head 58 will act through the lugs of the head 56 to impart one quarter of a revolution to the shaft 51. This movement of shaft 51 acts through arm 52, push-bar 53, arm 19 and spindle 16 to open the bolt member 15 thereby unlocking the door and permitting the spring-pressed plungers 41, Fig. 11, to partially open the door. When the bolt member is thus operated the slide-bar 26 remains at rest.

As shown in Fig. 1 the door 10 is connected with the front post 63 of the body frame by means of hinges whereof one is shown at 64. It will therefore be clear that when the door 10 is swung outwardly into its fully open position the head 56, Fig. 7, of rock shaft 51 is carried out of mesh with the head 58 of shaft 59. It will also be clear that when the door is closed the two heads 56 and 58 will again intermesh with their lugs alternating in the same manner as before whatever position shaft 59 may occupy between the limits determined by the stop pins 61 and 72.

The shaft 59 is provided at its forward end with a pulley 65, Fig. 1, to which is fastened one end of a cable 66. This cable extends around pulley 65 and thence around pulleys 67 and 68 to and through an aperture 69 provided through the dash or instrument board 70 of the vehicle. A handle 71 is provided at the inner extremity of cable 66 and this handle is accessible to the driver of the vehicle from his position on the driver's seat 75. It will be clear that handle 71 and cable 66 provide means through which the driver can manually rotate shaft 59 to the extent of one-quarter of a revolution when he desires to unlock and open the door 10. The movement thus imparted to shaft 59 by the driver is limited to one-quarter of a revolution through the engagement of the arm 60 with the second stop pin 72, Fig. 7.

The lost motion provided for between the intermeshing lugs of heads 56 and 58 permits the head 58 to be returned to its normal position by spring 62 independently of head 56 after the latter has been angularly adjusted by the former one-quarter of a revolution to unlock the door. In this way the heads 56 and 58 separably couple the two shafts 51 and 59, one member of this coupling being carried by the swinging door and the other member being supported by the frame of the body of the vehicle.

The boss 38 on the door, Fig. 4, is made wedge-shaped and is driven into the wedge-shaped pocket 39, Fig. 11, on body post 11 so as to snugly fit the same thereby properly lining up the pin 37 of stud 32 with the bolt member 15. Also the wedge-shaped boss 38 of the door is made upon its inner side with a passage or gateway 73, Fig. 4, through which the stud 32 can move into and out of the bolt member 15.

It is a distinguishing characteristic of the illustrated embodiment of my invention that the axes of stud 32, Fig. 11, and the rotary bolt member 15, Fig. 4, are parallel and alined when the door 10 occupies its closed position and that when said door 10 is swung on its hinges 64 the axis of bolt member 15 is moved sidewise relatively to the axis of stud 32.

What I claim is:

1. Lock mechanism for a door hingedly mounted upon the frame of a vehicle, said lock mechanism including a bolt member rotatably mounted on said door, and a stud on said frame with which said bolt member interlocks to secure the door in its closed position when said bolt member is rotatively adjusted in one direction; a horizontal shaft journaled on said door and provided at its one end with a coupling member, means connecting said shaft with said rotatable bolt member through which said shaft when rotated acts to rotatively adjust said bolt member in the opposite direction to unlock said door, and means mounted on said frame and accessible for operation by a person within the vehicle for operating said shaft, said means including a second shaft journaled on said frame provided at its one end with a coupling member to separably interlock with the coupling member on said first mentioned shaft when said door occupies its closed position.

2. Lock mechanism for a door hingedly mounted upon the frame of a vehicle, said lock mechanism including a bolt member rotatably mounted on said door and a stud on said frame with which said bolt member is interlocked to secure the door in its closed position when said bolt member is rotatively adjusted in one direction; a spring for rotating the bolt member in that direction; mechanism carried by said door that is manually operable to rotate said bolt member in the opposite direction thereby to unlock said door, and a spring-pressed tumbler on said door by which said bolt member is automatically secured in its unlocked position, said tumbler being shifted by said stud to release said bolt member when said door is closed thereby to permit said spring to rotatively adjust said bolt member to lock the door in its closed position.

3. The combination of claim 2 wherein there is also provided spring means for opening said door automatically thereby to permit said tumbler to engage and hold said bolt in its unlocked position when said bolt is moved in said opposite direction to free said door.

4. Lock mechanism for a door hingedly mounted upon the frame of a vehicle, said lock mechanism including a cup-shaped exteriorly cylindrical bolt member made at one side thereof with a passageway, said member being rotatably mounted on said door, and a stud on said frame adapted to enter and leave said member through said passageway when said member and stud are moved relatively sidewise; a spring for rotating the bolt member in one direction while it is occupied by said stud thereby to confine the stud within said bolt member and lock the door in its closed position; mechanism mounted on said door and manually operable to rotate said bolt member in the opposite direction thereby to release the stud and unlock said door, and a spring-pressed tumbler on said door by which said bolt member is automatically secured in its unlocked position, said tumbler being shifted by said stud to bolt-releasing position when said door is closed thereby to permit said spring to rotatively adjust said bolt member to lock the door in its closed position.

5. The combination of claim 4 wherein said bolt member is made with a cylindrical wall formed with a keyhole slot; wherein said tumbler is a spring-pressed plunger adapted to fit into the enlarged end of said keyhole slot, and wherein said stud is made with a laterally projecting pin adapted to push said plunger out of said slot when the door is closed, said pin being made smaller than said plunger so as to traverse the relatively narrow portion of said slot when said bolt member is rotated by said spring to lock the door.

6. Lock mechanism for a door hingedly mounted upon the frame of a vehicle, said lock mechanism including a bolt member rotatably mounted on said door and a stud on said frame with which said bolt member is interlocked to secure the door in its closed position when said bolt member is rotatively adjusted in one direction; a spring for rotating the bolt member in that direction; a supplemental lock mechanism mounted on said door including a rotatable key-operated barrel; mechanism connecting said bolt member and barrel through which rotation of the latter acts to rotate said bolt member in the opposite direction, thereby to unlock said door, and a tumbler by which said bolt member is automatically secured in its unlocked position, said tumbler being shifted by said stud to bolt-releasing position when said door is closed thereby to permit said spring to rotatively adjust said bolt member to lock the door in its closed position.

RICHARD F. JOYCE.